(12) United States Patent
Bickford et al.

(10) Patent No.: US 9,058,034 B2
(45) Date of Patent: Jun. 16, 2015

(54) INTEGRATED CIRCUIT PRODUCT YIELD OPTIMIZATION USING THE RESULTS OF PERFORMANCE PATH TESTING

(75) Inventors: Jeanne P. Bickford, Essex Junction, VT (US); Peter A. Habitz, Hinesburg, VT (US); Vikram Iyengar, Pittsburgh, PA (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 13/570,285

(22) Filed: Aug. 9, 2012

(65) Prior Publication Data

US 2014/0046466 A1 Feb. 13, 2014

(51) Int. Cl.
*G06F 17/50* (2006.01)
*G05B 19/418* (2006.01)

(52) U.S. Cl.
CPC *G05B 19/41875* (2013.01); *G05B 2219/32182* (2013.01); *G05B 2219/32187* (2013.01); *G05B 2219/32208* (2013.01); *G05B 2219/37224* (2013.01)

(58) Field of Classification Search
CPC ............... G05B 19/41875; G05B 2219/32182; G05B 2219/37224; G05B 2219/32208; G05B 2219/32187
See application file for complete search history.

(56) References Cited

U.S. PATENT DOCUMENTS

| | | | |
|---|---|---|---|
| 5,923,553 A | 7/1999 | Yi | |
| 6,473,665 B2 | 10/2002 | Mugibayashi et al. | |
| 6,629,009 B1 | 9/2003 | Tamaki | |
| 6,678,569 B2 | 1/2004 | Bunkofske et al. | |
| 6,734,744 B2 | 5/2004 | Monzel et al. | |
| 6,795,952 B1 | 9/2004 | Stine et al. | |
| 6,834,375 B1 | 12/2004 | Stine et al. | |
| 6,901,564 B2 * | 5/2005 | Stine et al. | 716/56 |
| 6,934,671 B2 * | 8/2005 | Bertsch et al. | 703/14 |
| 6,978,189 B1 | 12/2005 | Bode et al. | |
| 7,171,283 B2 | 1/2007 | Popp et al. | |
| 7,174,523 B2 * | 2/2007 | Engel et al. | 716/52 |
| 7,487,477 B2 * | 2/2009 | Bickford et al. | 716/136 |
| 7,539,893 B1 * | 5/2009 | Ferguson | 714/6.1 |

(Continued)

OTHER PUBLICATIONS

Xiong, et al., "Statistical Multilayer Process Space Coverage for At-Speed Test," 2009 IEEE/ACM Design Automation Conference, Jul. 2009, pp. 340-345.

(Continued)

*Primary Examiner* — Naum B Levin
(74) *Attorney, Agent, or Firm* — Gibb & Riley, LLC (57) ABSTRACT

Disclosed are embodiments of a method, system and computer program product for optimizing integrated circuit product yield by re-centering the manufacturing line and, optionally, adjusting wafer-level chip dispositioning rules based on the results of post-manufacture (e.g., wafer-level or module-level) performance path testing. In the embodiments, a correlation is made between in-line parameter measurements and performance measurements acquired during the post-manufacture performance path testing. Then, based on this correlation, the manufacturing line can be re-centered. Optionally, an additional correlation is made between performance measurements acquired during wafer-level performance testing and performance measurements acquired particularly during module-level performance path testing and, based on this additional correlation, adjustments can be made to the wafer-level chip dispositioning rules to further minimize yield loss.

20 Claims, 7 Drawing Sheets

(56) References Cited

U.S. PATENT DOCUMENTS

| | | | |
|---|---|---|---|
| 7,656,182 B2 | 2/2010 | Bickford et al. | |
| 7,730,434 B2* | 6/2010 | Aghababazadeh et al. | 716/136 |
| 7,895,545 B2 | 2/2011 | Cohn et al. | |
| 7,917,451 B2* | 3/2011 | Barnett et al. | 705/400 |
| 8,490,040 B2* | 7/2013 | Bickford et al. | 716/113 |
| 2009/0182522 A1* | 7/2009 | Visweswariah et al. | 702/117 |
| 2009/0234777 A1* | 9/2009 | Barnett et al. | 705/400 |
| 2011/0191055 A1* | 8/2011 | Martinez et al. | 702/117 |
| 2012/0010837 A1* | 1/2012 | Habitz et al. | 702/79 |
| 2013/0014075 A1* | 1/2013 | Habitz et al. | 716/136 |

OTHER PUBLICATIONS

Iyengar, et al., "Variation-Aware Performance Verification Using At-Speed Structural Test and Statistical Timing," 2007 IEEE/ACM International Conference on Computer-Aided Design, 2007, pp. 405-412.

Xiong, et al., "Optimal Margin Computation for At-Speed Test," International Conference on Design, Automation and Test in Europe, Munich, Germany, Mar. 2008, 6 pages.

Zolotov, et al., "Statistical Path Selection for At-Speed Test," 2008 IEEE/ACM International Conference on Computer-Aided Design, 2008, pp. 624-631.

Xiong, et al., "Pre-ATPG Path Selection for Near Optimal Post-ATPG Process Space Coverage," 2009 IEEE/ACM International Conference on Computer-Aided Design Digest of Technical Papers, Nov. 2-5, 2009, pp. 89-96.

Bickford, et al., U.S. Appl. No. 13/294,210, filed Nov. 11, 2011.
Bickford, et al., U.S. Appl. No. 13/294,220, filed Nov. 11, 2011.
Bickford, et al., U.S. Appl. No. 13/294,243, filed Nov. 11, 2011.
Lee, et al., "Critical Path Identification and Delay Tests of Dynamic Circuits," ITC '99 Proceedings of the 1999 IEEE International Test Conference, Paper 16.3, 1999, pp. 421-430.

Kruseman, et al., "On Performance Testing with Path Delay Patterns," 25th IEEE VLSI Test Symposium, May 6-10, 2007, pp. 29-34.

* cited by examiner

INTEGRATED CIRCUIT PRODUCT YIELD OPTIMIZATION USING THE RESULTS OF PERFORMANCE PATH TESTING

BACKGROUND

1. Field of the Invention

The embodiments disclosed herein relate to integrated circuit product yield and, more particularly, to a method, system and computer program product for optimizing integrated circuit product yield based on the results of post-manufacture performance path testing.

2. Description of the Related Art

Currently, performance measurements and, particularly, frequency measurements acquired during performance screen ring oscillator (PSRO) testing are often used to disposition (i.e., screen) chips at both the wafer-level and the module-level (i.e., the integrated circuit chip package-level). For purposes of this disclosure, wafer-level chip dispositioning refers to wafer-level performance testing to determine whether chips on wafers pass and, thus, are processed into chip modules or fail and, thus, are scrapped. Similarly, module-level chip dispositioning refers to module-level performance testing to determine whether the chip modules pass and, thus, are shipped to customers or fail and, thus, are scrapped. Performance measurements acquired during post-manufacture (i.e., wafer-level or module level) PSRO testing are also often used as feedback to control or re-center (i.e., re-calibrate) the manufacturing line in order to account for product-to-product layout variation. Unfortunately, manufacturing line re-centering based on post-manufacture PSRO performance measurements can result in a significant yield loss.

SUMMARY

In view of the foregoing, disclosed herein are embodiments of a method, system and computer program product for optimizing integrated circuit product yield by re-centering the manufacturing line and, optionally, adjusting wafer-level chip dispositioning rules, based on the results of post-manufacture performance path testing. Specifically, in the embodiments, a correlation can be made between in-line parameter measurements and performance measurements acquired during post-manufacture performance path testing. Based on this correlation, the manufacturing line can be re-centered. Since the correlation between in-line parameter measurements and performance measurements acquired during post-manufacture performance path testing is more accurate than a correlation between in-line parameter measurements and post-manufacture performance screen ring oscillator (PSRO) testing, yield loss is minimized. Optionally, an additional correlation can be made between performance measurements acquired during wafer-level performance testing (e.g., performance screen ring oscillator (PSRO) testing or other wafer-level performance testing) and performance measurements acquired particularly during module-level performance path testing and, based on this additional correlation, adjustments can be made to the wafer-level chip dispositioning rules to further minimize yield loss.

More particularly, disclosed herein are embodiments of a computer-implemented method for optimizing integrated circuit product yield. The method can comprise accessing both in-line parameter measurements acquired during manufacture of an integrated circuit and performance measurements acquired during post-manufacture (e.g., wafer-level or module-level) performance path testing of the integrated circuit.

Next, a correlation between the in-line parameter measurements and the performance measurements can be determined and, based on this correlation, the manufacturing line can be re-centered. That is, based on this correlation, adjustments can be made to target parameter values and, in turn, to the manufacturing process specifications, to be used during subsequent manufacture of the integrated circuit in order to achieve target integrated circuit performance values. Since the correlation between in-line parameter measurements and performance measurements acquired during post-manufacture performance path testing is more accurate than a correlation between in-line parameter measurements and performance measurements acquired during post-manufacture performance screen ring oscillator (PSRO) testing, yield loss is minimized.

In one embodiment, the post-manufacture performance path testing can comprise module-level performance path testing. In this case, the method can, optionally, further comprise accessing additional performance measurements acquired during wafer-level performance testing of the integrated circuit. Such wafer-level performance testing can be wafer-level performance screen ring oscillator (PSRO) testing, wafer-level performance path testing, or any other suitable wafer-level performance testing performed for the purpose of wafer-level chip dispositioning based on wafer-level chip dispositioning rules. Next, an additional correlation can be determined between the performance measurements, which were acquired during the module-level performance path testing, and the additional performance measurements, which were acquired during wafer-level performance testing. Based on this additional correlation, the wafer-level chip dispositioning rules to be applied during subsequent wafer-level chip dispositioning processes can be adjusted to further minimize yield loss.

Also disclosed herein are embodiments of a computer system for optimizing integrated circuit product yield. This computer system can comprise a memory that stores in-line parameter measurements acquired during manufacture of an integrated circuit and performance measurements acquired during post-manufacture (e.g., wafer-level or module-level) performance path testing of the integrated circuit.

The computer system can further comprise at least one processor comprising a correlator and a process optimizer. The correlator can access the memory and can determine a correlation between the in-line parameter measurements and the performance measurements. Then, based on this correlation, the process optimizer can re-center the manufacturing line. That is, the process optimizer can, based on this correlation, adjust target parameter values and, in turn, the manufacturing process specifications to be used during subsequent manufacture of the integrated circuit in order to achieve target integrated circuit performance values. Since the correlation between in-line parameter measurements and performance measurements acquired during post-manufacture performance path testing is more accurate than a correlation between in-line parameter measurements and performance measurements acquired during post-manufacture performance screen ring oscillator (PSRO) testing, yield loss is minimized.

In one embodiment, the post-manufacture performance path testing can comprise module-level performance path testing. In this case, the memory can, optionally, also store wafer-level performance measurements taken during wafer-level performance testing of the integrated circuit. Such wafer-level performance testing can be wafer-level PSRO testing, wafer-level performance path testing, or any other suitable wafer-level performance testing performed for the purpose of wafer-level chip dispositioning based on wafer-level chip dispositioning rules. In this case, the correlator can further determine an additional correlation between performance measurements, which were acquired during module-level performance path testing, and the additional performance measurements, which were acquired during wafer-level performance testing. Then, based on this additional correlation, the process optimizer can make adjustments to the wafer-level chip dispositioning rules to be applied during subsequent wafer-level chip dispositioning processes to further minimize yield loss.

Also disclosed herein are embodiments of a computer program product. This computer program product can comprise a computer-readable storage medium, which stores a computer-readable program code. The computer-readable program code can comprise instructions that, when executed by a computer, perform the above-described method.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, currently, performance measurements and, particularly, frequency measurements acquired during performance screen ring oscillator (PSRO) testing are often used to disposition (i.e., screen) chips at both the wafer-level and the module-level (i.e., the integrated circuit chip package-level). For purposes of this disclosure, wafer-level chip dispositioning refers to wafer-level performance testing to determine whether the chips on wafers pass and, thus, are processed into chip modules or fail and, thus, are scrapped. Similarly, module-level chip dispositioning refers to module-level performance testing to determine whether the chip modules pass and, thus, are shipped to customers or fail and, thus, are scrapped. Performance measurements acquired during post-manufacture (i.e., wafer-level or module-level) PSRO testing are also often used as feedback to control or re-center (i.e., re-calibrate) the manufacturing line in order to account for product-to-product layout variation.

Figure 1A:
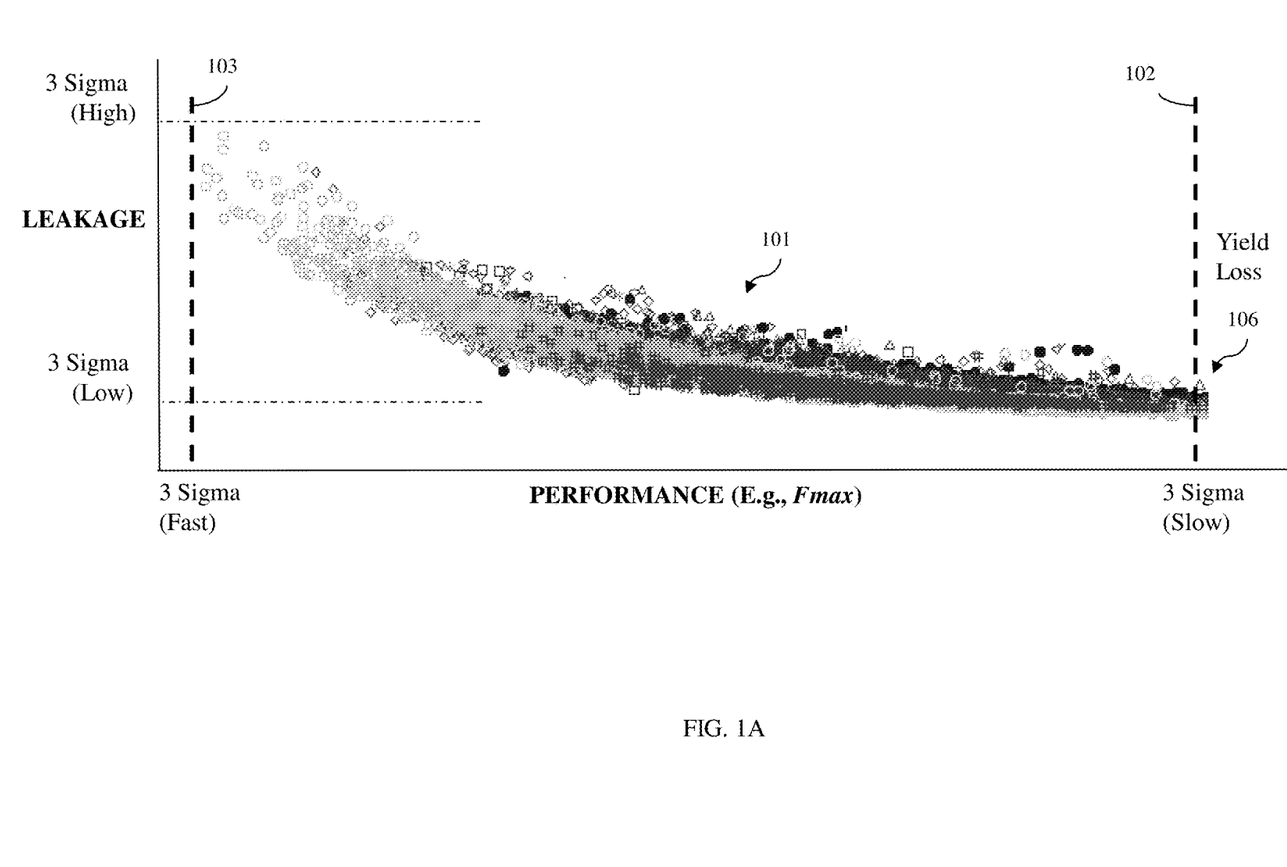
FIG. 1A is a graph illustrating optimal manufacturing line control (i.e., optimal manufacturing line centering) for minimal yield loss.
Figure 1B:
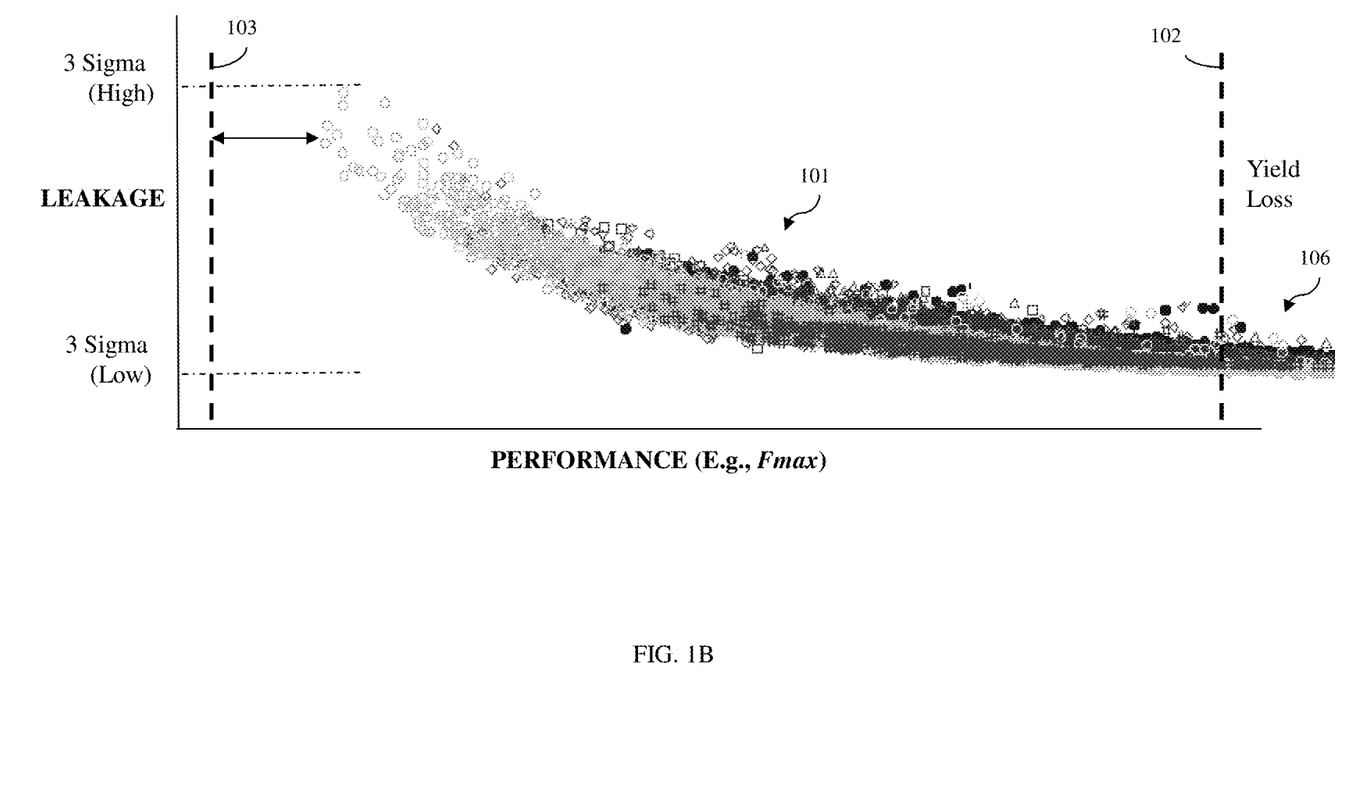
FIG. 1B is a graph illustrating less than optimal manufacturing line control (i.e., less than optimal manufacturing line centering) resulting in significant yield loss.

Unfortunately, manufacturing line re-centering based on the performance measurements acquired during post-manufacture performance screen ring oscillator (PSRO) testing can result in a significant yield loss. More specifically, the graph of FIG. 1A illustrates optimal manufacturing line control (i.e., optimal manufacturing line centering) for minimal yield loss. With optimal manufacturing line control, the leakage current to performance curve 101 should be essentially bounded at 3 sigma fast 103 and 3 sigma slow 102 such that the greatest amount of allowable leakage is seen at the 3 sigma fast point and the least amount of leakage will be seen at the 3 sigma slow 102 point. In this case, only a very small part (see chips 106) of the distribution will extend past the 3 sigma slow point such that there is only very small amount of yield loss. However, optimal manufacturing line control can only be achieved if the integrated circuit chip performance can be accurately correlated with post-manufacture performance measurements. FIG. 1B illustrates less than optimal manufacturing line control (i.e., less than optimal manufacturing line centering) resulting in significant yield loss because the integrated circuit chip performance is not accurately correlated with post-manufacture performance measurements (e.g., post-manufacture performance screen ring oscillator (PSRO) test measurements or other conventional post-manufacture performance test measurements). For example, actual chip performance may be faster than what the PSRO test measurements indicate such that the leakage current to performance curve 101 slides to the right and a greater part of the distribution (see chips 106) fall outside the 3 sigma slow point 102, resulting in greater yield loss.

In view of the foregoing, disclosed herein are embodiments of a method, system and computer program product for optimizing integrated circuit product yield by re-centering the manufacturing line and, optionally, adjusting wafer-level chip dispositioning rules, based on the results of post-manufacture performance path testing. Specifically, post-manufacture chip dispositioning can be performed at the wafer-level or module-level using performance path testing (e.g., as discussed in U.S. Patent Applications assigned to International Business Machines Corporation of Armonk, N.Y., and incorporated herein by reference: application Ser. No. 13/294,210, titled "Test Path Selection And Test Program Generation For Performance Testing Integrated Circuit Chips" of Bickford et al., filed on Nov. 11, 2011 and U.S. patent application Ser. No. 13/294,220, titled "Disposition Of Integrated Circuits Using Performance Sort Ring Oscillator And Performance Path Testing" of Bickford et al., filed on Nov. 11, 2011) as opposed to performance screen ring oscillator (PSRO) testing or other types of performance testing. In the embodiments disclosed herein, a correlation can be made between in-line parameter measurements and performance path measurements acquired during the post-manufacture performance path testing. Then, based on this correlation, the manufacturing line can be re-centered. Since the correlation between in-line parameter measurements and performance measurements acquired during post-manufacture performance path testing is more accurate than a correlation between in-line parameter measurements and performance measurements acquired during post-manufacture performance screen ring oscillator (PSRO) testing, yield loss is minimized. Optionally, an additional correlation can be made between performance measurements acquired during wafer-level performance testing (e.g., performance screen ring oscillator (PSRO) testing or other wafer-level testing) and performance measurement acquired particularly during module-level performance path testing and, based on this additional correlation, adjustments can be made to the wafer-level chip dispositioning rules to further minimize yield loss.

More particularly, disclosed herein are embodiments of a computer-implemented method for optimizing integrated circuit product yield.

Figure 2:
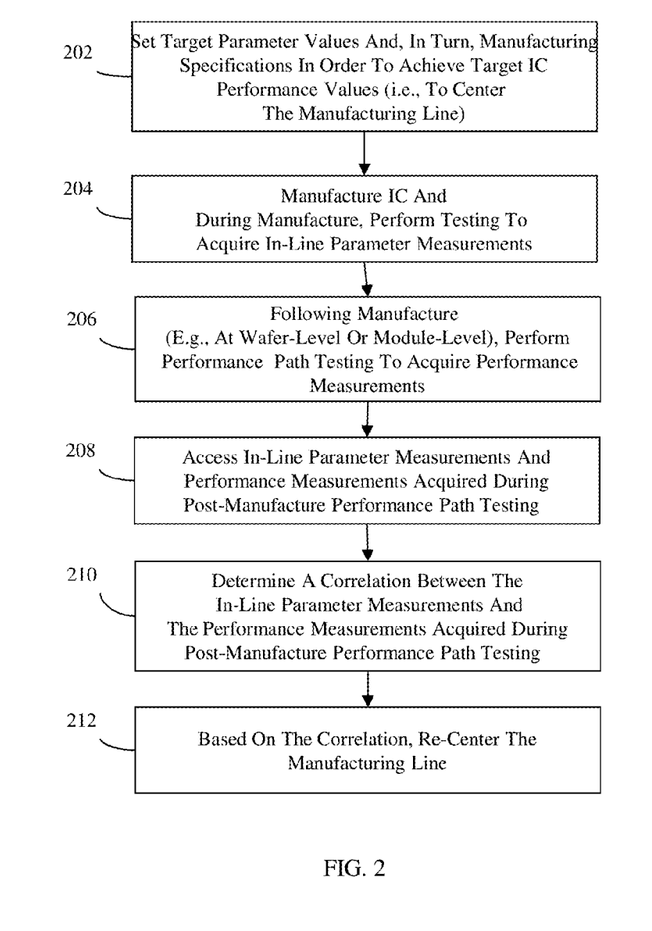
FIG. 2 is a flow diagram illustrating, generally, embodiments of a method for optimizing integrated circuit product yield by re-centering the manufacturing line.

Generally, as illustrated in the flow diagram of FIG. 2, the method can comprise establishing the manufacturing process specifications required to achieve target parameter values and, in turn, to achieve target integrated circuit (IC) performance values (i.e., center the manufacturing line) (202). Such target parameter values can comprise target physical and/or electrical parameters for devices (e.g., field effect transistors) and other components (e.g., wires, interconnects, etc.) within the integrated circuit. For example, such target parameter values can comprise physical and/or electrical parameter values, such as base parameter values (e.g., effective channel length (Leff), threshold voltage (Vt), wire width, on-current (Ion), etc.) or composite parameter values.

Next, manufacture of the integrated circuit can proceed and, during manufacture, testing or monitoring can be performed in order to directly or indirectly acquire in-line parameter measurements (204). Such in-line parameter measurements can comprise physical and/or electrical parameter measurements, such as base parameter measurements (e.g., effective channel length (Leff), threshold voltage (Vt), wire width, on-current (Ion), etc.) or composite parameter measurements (e.g., performance screen ring oscillator (PSRO) measurements). In-line testing or monitoring to acquire these measurements can be performed using, for example, conventional scribe-line (Kerf) structures. Alternatively, such in-line testing or monitoring can be performed using on-chip structures, such as performance screen ring oscillators (PSROs) or other on-chip structures (e.g., as described in U.S. Pat. No. 7,656,182 of Bickford, et al., issued on Feb. 2, 2010, assigned to International Business Machines Corporation of Armonk, N.Y. and incorporated herein by reference).

Following manufacture, performance path testing can be performed at the wafer-level or the module-level in order to acquire performance measurements (206). Specifically, during such performance path testing, a timing run can be made using the statistical modeling of the process parameters. Then, sensitizable data paths can be selected for test and the expected delay under specified test conditions (i.e., under a specified voltage, temperature, and slowest parameter expected from the manufacturing line e.g., typically 3 sigma slow) can be calculated for each of the selected data paths. Next, performance testing of the selected data paths can be performed and, following performance testing, the chips can be dispositioned pass or fail (i.e., Go or No Go) based on a comparison of the expected delay to the actual delay of each of the selected data paths. For example, chips with any data path testing slower than the minimum allowed delay can be considered to have failed and, thus, can be scrapped. However, chips with all of the selected data paths testing at or faster than the minimum allowed delay can be considered to have passed and, thus, can be further processed, as appropriate (e.g., packaged into a chip module following wafer-level dispositioning or shipped to a customer following module-level dispositioning). See U.S. patent application Ser. No. 13/294,210 and U.S. patent application Ser. No. 13/294,220, incorporated by reference above, for a more detailed discussion of performance path testing for chip dispositioning purposes.

It should, however, be noted that in order to acquire performance measurements during performance path testing, additional processing must be performed. Specifically, following chip dispositioning, a sample of the passing chips can be selected and subjected to additional performance path testing and, particularly, subjected to performance path shmoo testing. During performance path shmoo testing, the testing frequency of each passing chip can be increased until that chip fails. The chip delay can be deduced from such failing testing frequency. The delay or frequency at which the previously passing chips fail can then be used as the aforementioned performance measurements.

The method can further comprise accessing both the in-line parameter measurements acquired during manufacture of an integrated circuit and the performance measurements acquired during post-manufacture (e.g., wafer-level or module-level) performance path testing of the integrated circuit (208). Next, a correlation between the in-line parameter measurements and the performance measurements can be determined (210) and, based on this correlation, the manufacturing line can be re-centered (212). That is, based on this correlation, adjustments can be made to target parameter values and, in turn, to the manufacturing process specifications, to be used during subsequent manufacture of the integrated circuit in order to achieve target integrated circuit performance values. Since the correlation between in-line parameter measurements and performance measurements acquired during post-manufacture performance path testing is more accurate than a correlation between in-line parameter measurements and performance measurements acquired during post-manufacture performance screen ring oscillator (PSRO) testing, yield loss is minimized.

Figure 3:
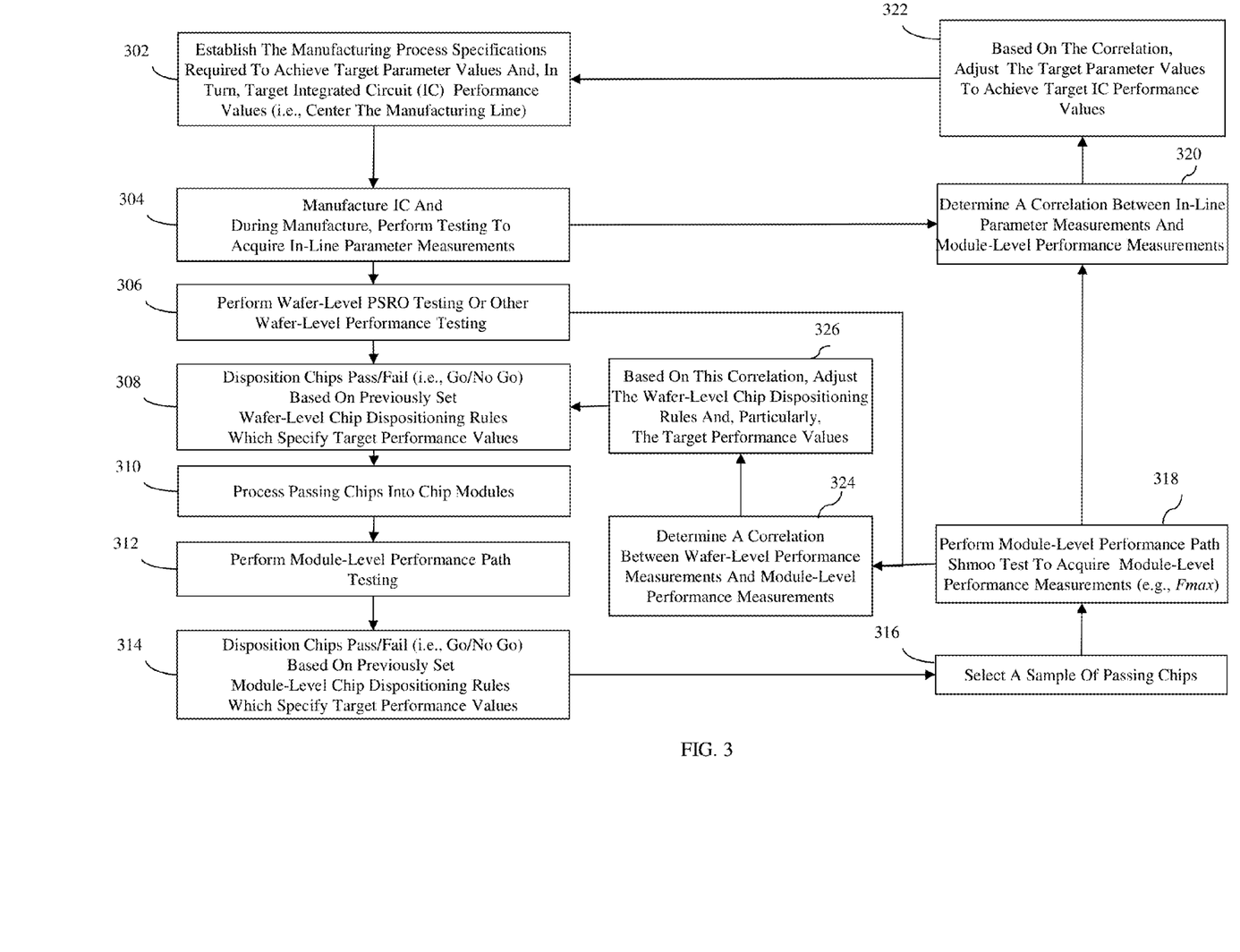
FIG. 3 is a flow diagram illustrating one embodiment of a method for optimizing integrated circuit product yield by re-centering the manufacturing line.

More specifically, in one embodiment of the method as illustrated in the flow diagram of FIG. 3, the method can comprise establishing the manufacturing process specifications required to achieve target parameter values and, in turn, target integrated circuit performance values (i.e., centering the manufacturing line) (302). This process 302 can be performed in the same manner as discussed above with regard to process step 202 of FIG. 2.

Next, manufacture of the integrated circuit can proceed and, during manufacture, testing or monitoring can be performed in order to directly or indirectly acquire in-line parameter measurements (304). This process 304 can be performed in the same manner as discussed above with regard to process step 204 of FIG. 2.

Following manufacture, wafer-level performance testing can be performed (306) and chips can be dispositioned based on wafer-level dispositioning rules that specify target performance values (308). That is, the results of the wafer-level performance testing can be used to determine whether the chips on wafers pass and, thus, are processed into chip modules or fail and, thus, are scrapped. Wafer-level performance testing at process 306 can comprise conventional performance screen ring oscillator (PSRO) testing. In this case, frequency measurements acquired from PSROs can be compared to a target frequency value and, at process 308, a PSRO frequency measurement at or above a target frequency value (as set forth in the wafer-level chip dispositioning rules) can indicate a pass, whereas a PRSO frequency measurement below the target frequency value can indicate a fail. Alternatively, wafer-level performance testing at process 306 can comprise selected performance path testing, wherein, as discussed above, a timing run can be made using the statistical modeling of the process parameters. Then, sensitizable data paths can be selected for test and the expected delay under specified test conditions (i.e., under a specified voltage, temperature, and slowest parameter expected from the manufacturing line e.g., typically 3 sigma slow) can be calculated for each of the selected data paths. Next, performance testing of the selected data paths can be performed and, following performance testing, the chips can be dispositioned pass or fail (i.e., Go or No Go) based on a comparison of the expected delay to the actual delay of each of the selected data paths. For example, chips with any data path testing slower than the minimum allowed delay can be considered to have failed and, thus, can be scrapped. However, chips with all of the selected data paths testing at or faster than the minimum allowed delay can be considered to have passed and, thus, can be packaged into a chip module (310).

Then, module-level performance testing can be performed (312) and chip modules can be dispositioned pass or fail (i.e., Go or No Go), according to chip module dispositioning rules that specify the target performance values (314). That is, the results of the module-level performance testing can then be used to determine whether the individual chip modules pass and, thus, are shipped to customers or fail and, thus, are scrapped.

In this embodiment, the module-level performance testing at process 312 can specifically comprise selected performance path testing. Specifically, a timing run can be made using the statistical modeling of the process parameters. Then, sensitizable data paths can be selected for test and the expected delay under specified test conditions (i.e., under a specified voltage, temperature, and slowest parameter expected from the manufacturing line e.g., typically 3 sigma slow) is calculated. Chips are then dispositioned Pass/Fail based on a comparison of the expected delay to the actual delay of each of the selected data paths. For example, chips with any data path slower than the minimum allowed delay are failed and, thereby scrapped. However, chips with all data paths at or faster than the minimum allowed delay are passed and, thereby advanced to chip packaging following wafer-level dispositioning or shipped following module-level dispositioning. See U.S. patent application Ser. No. 13/294,210 and U.S. patent application Ser. No. 13/294,220, incorporated by reference above, for a more detailed discussion of performance path testing for chip dispositioning purposes.

In addition, in this embodiment, the results of the module-level performance path testing performed at process 312 can also be used to re-center the manufacturing line in order to optimize yield. In order to accomplish this, following dispositioning, a sample of the passing chips can be selected (316) and subjected to additional performance path testing and, particularly, performance path shmoo testing (318) in order to acquire performance measurements. Specifically, during performance path shmoo testing, the testing frequency of each passing chip can be increased until that chip fails. The chip delay can be deduced from such failing testing frequency. The delay or frequency at which the previously passing chips fail can then be used as the aforementioned performance measurements.

Then, following module-level performance path testing at processes 312-318 and, particularly, following the module-level performance path shmoo testing at process 318, both the in-line parameter measurements acquired during manufacture of an integrated circuit at process 304 and the module-level performance measurements acquired during module-level performance path shmoo testing of the integrated circuit at process 318 can be accessed and a correlation between the measurements (i.e., between in-line parameter measurements and the module-level performance measurements) can be determined (320). The correlation can be a measure of the strength and direction of the relationship between the various in-line parameter measurements to the module-level performance measurements Then, based on this correlation, the manufacturing line can be re-centered. That is, based on this correlation, adjustments can be made to target parameter values and, in turn, to the manufacturing process specifications, to be used during subsequent manufacture of the integrated circuit in order to achieve target integrated circuit performance values (322). Since the correlation between in-line parameter measurements and performance measurements acquired during module-level performance path testing is more accurate than a correlation between in-line parameter measurements and performance measurements acquired during module-level PSRO testing, yield loss is minimized as compared to prior art re-centering techniques. The processes described above (e.g., process 302 of establishing manufacturing process specifications based on the now-adjusted target parameter values, process 304 of manufacturing the integrated circuit, etc.) can be iteratively repeated so that yield is continuously optimized.

Optionally, this embodiment of the method can further comprise accessing the wafer-level performance measurements acquired during wafer-level performance testing of the integrated circuit at process 306 and the module-level performance measurements acquired during module-level performance path shmoo testing at process 318 and determining an additional correlation between the wafer-level performance measurements and the module-level performance measurements (324). This additional correlation can be the measure of the strength and direction of the relationship between the wafer-level performance measurements and the module-level performance measurements. As discussed above, the wafer-level performance testing at process 306 can comprise PSRO testing, performance path testing or any other suitable performance testing. However, it should be noted that, if wafer-level performance path testing is used at process 306, then the results must include actual performance measurements from the selected performance paths in order to make the additional correlation at process 324. Therefore, additional processing and, particularly, performance path shmoo testing, as discussed in detail above, will also be required during wafer-level performance path testing in order to acquire wafer-level performance measurements.

Then, based on this additional correlation from process 324, the wafer-level chip dispositioning rules to be applied during subsequent wafer-level chip dispositioning processes can be adjusted to further minimize yield loss (326). For example, the target frequency measurement used for chip dispositioning in the case of wafer-level performance screen ring oscillator (PSRO) performance testing can be adjusted. The processes described above can be iteratively repeated so that yield is continuously optimized.

Figure 4:
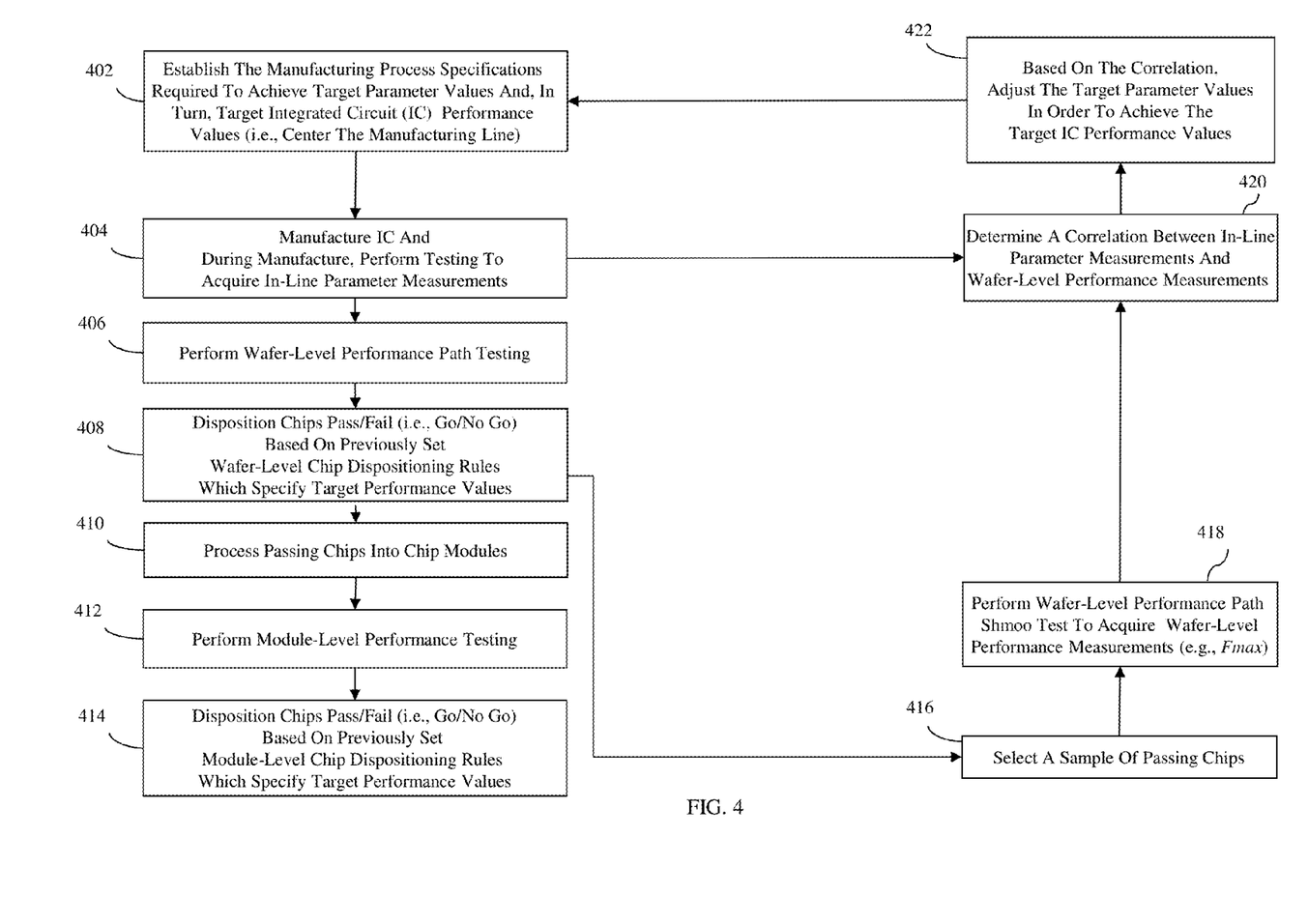
FIG. 4 is a flow diagram illustrating another embodiment of a method for optimizing integrated circuit product yield by re-centering the manufacturing line.

In another embodiment of the method as illustrated in the flow diagram of FIG. 4, the method can comprise establishing the manufacturing process specifications required to achieve target parameter values and, in turn, target integrated circuit performance values (i.e., centering the manufacturing line) (402). This process 402 can be performed in the same manner as discussed above with regard to process step 202 of FIG. 2.

Next, manufacture of the integrated circuit can proceed and, during manufacture, testing or monitoring can be performed in order to directly or indirectly acquire in-line parameter measurements (404). This process 404 can be performed in the same manner as discussed above with regard to process step 204 of FIG. 2.

Following manufacture, wafer-level performance testing and, particularly, wafer-level performance path testing can be performed (406) and chips can be dispositioned based on wafer-level dispositioning rules that specify target performance values (408). Specifically, such wafer-level performance path testing can comprise making a timing run can be made using the statistical modeling of the process parameters. Then, sensitizable data paths can be selected for test and the expected delay under specified test conditions (i.e., under a specified voltage, temperature, and slowest parameter expected from the manufacturing line e.g., typically 3 sigma slow) can be calculated for each of the selected data paths.

Next, performance testing of the selected data paths can be performed and, following performance testing, the chips can be dispositioned pass or fail (i.e., Go or No Go) based on a comparison of the expected delay to the actual delay of each of the selected data paths. For example, chips with any data path testing slower than the minimum allowed delay can be considered to have failed and, thus, can be scrapped. However, chips with all of the selected data paths testing at or faster than the minimum allowed delay can be considered to have passed and, thus, can be packaged into a chip module (410). Module-level performance testing 412 and module-level chip disposition 414 can then be performed according to conventional techniques or, alternatively, can be performed in the same manner as described in detail above and illustrated in FIG. 3.

In addition, in this embodiment, the results of the wafer-level performance path testing performed at process 406 can also be used to re-center the manufacturing line in order to optimize yield. In order to accomplish this, following dispositioning, a sample of the passing chips can be selected (416) and subjected to additional performance path testing and, particularly, performance path shmoo testing (418) in order to acquire performance measurements. Specifically, during performance path shmoo testing, the testing frequency of each passing chip can be increased until that chip fails. The chip delay can be deduced from such failing testing frequency. The delay or frequency at which the previously passing chips fail can then be used as the aforementioned performance measurements.

Then, following wafer-level performance path testing and, particularly, following the module-level performance path shmoo testing at process 418, both the in-line parameter measurements acquired during manufacture of an integrated circuit at process 404 and the wafer-level performance measurements acquired during wafer-level performance path shmoo testing of the integrated circuit at process 418 can be accessed and a correlation between the measurements (i.e., between in-line parameter measurements and the wafer-level performance measurements) can be determined (420). The correlation can be a measure of the strength and direction of the relationship between the various in-line parameter measurements to the wafer-level performance measurements.

Then, based on this correlation, the manufacturing line can be re-centered. That is, based on this correlation, adjustments can be made to target parameter values and, in turn, to the manufacturing process specifications, to be used during subsequent manufacture of the integrated circuit in order to achieve target integrated circuit performance values (422). Since the correlation between in-line parameter measurements and performance measurements acquired during module-level performance path testing is more accurate than a correlation between in-line parameter measurements and performance measurements acquired during module-level PSRO testing, yield loss is minimized as compared to prior art re-centering techniques. The processes described above can be iteratively repeated so that yield is continuously optimized.

Figure 5:
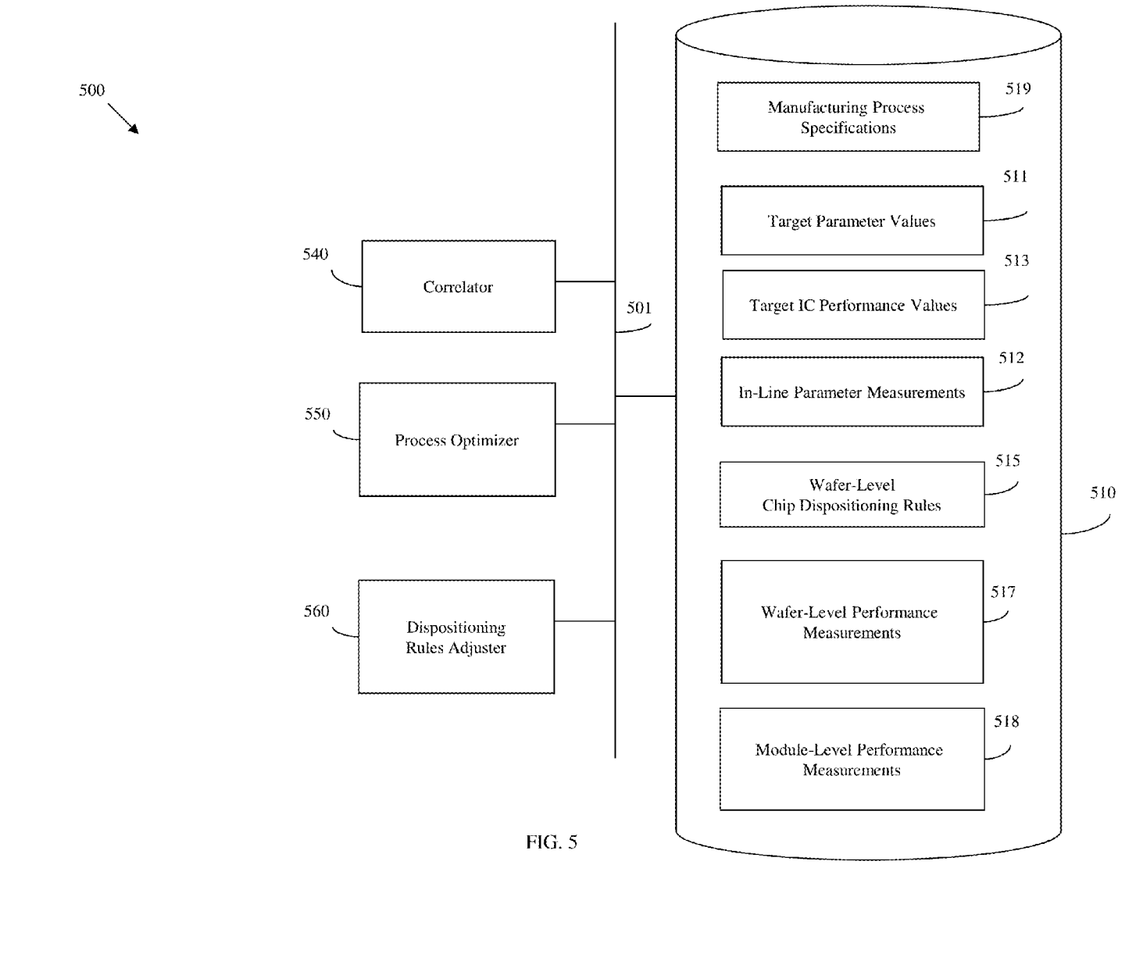
FIG. 5 is schematic diagram illustrating an embodiment of system for optimizing integrated circuit product yield by re-centering the manufacturing line.

Referring to FIG. 5, also disclosed herein are embodiments of a computer system 500 that can implement (i.e., that is adapted to implement, that is configured to implement, etc.) the method embodiments described above in order to optimize integrated circuit product yield. For example, such a computer system 500 can comprise one or memory devices 510 and at least one processor in communication with the memory device(s) 510.

The memory device(s) 510 can store (i.e., can be adapted to store, can be configured to store, etc.) in-line parameter measurements 512 acquired during manufacture of an integrated circuit. Such in-line parameter measurements can comprise physical parameter measurements and/or electrical parameter measurements, such as base parameter measurements (e.g., effective channel length (Leff), threshold voltage (Vt), wire width, on-current (Ion), etc.) and composite parameter measurements (e.g., performance screen ring oscillator (PSRO) measurements). Such in-line parameter measurements can be acquired during in-line testing or monitoring performed using, for example, conventional scribe-line (Kerf) structures. Alternatively, such in-line parameter measurements can be acquired during in-line testing or monitoring performed using on-chip structures, such as performance screen ring oscillators (PSROs) or other on-chip structures (e.g., as described in U.S. Pat. No. 7,656,182 of Bickford, et al., issued on Feb. 2, 2010, assigned to International Business Machines Corporation of Armonk, N.Y. and incorporated herein by reference).

Additionally, the memory device(s) 510 can store (i.e., can be adapted to store, can be configured to store, etc.) performance measurements 517 or 518 acquired during post-manufacture (e.g., either wafer-level or module-level) performance path testing of the integrated circuit.

The processor(s) can comprise a correlator 540. The correlator 540 can access the memory device(s) 510 and determine (i.e., can be adapted to access the memory device(s) and determine, can be configured to access the memory device(s) and determine, can be programmed to access the memory device(s) and determine, etc.) a correlation between the parameter measurements 512 acquired during manufacture of the integrated circuit and the performance measurements 517 or 518 acquired during post-manufacture performance path testing.

The processor(s) can further comprise a process optimizer 550. The process optimizer 550 can re-center (i.e., can be adapted to re-center, can be configured to re-center, can be programmed to re-center, etc.) the manufacturing line based on that correlation. Specifically, the process optimizer 550 can adjust (i.e., can be adapted to adjust, can be configured to adjust, can be programmed to adjust, etc.), based on this correlation, the target parameter values 511 and, in turn, the manufacturing process specifications 519, to be used during subsequent manufacture of the integrated circuit so that the target integrated circuit (IC) performance values 513 is achieved (all of which can also be stored in the memory device(s) 510).

As mentioned above, in one embodiment, the performance measurements acquired during post-manufacture performance path testing can comprise performance measurements 517 acquired during wafer-level performance path testing. The flow diagram of FIG. 4, discussed in detail above, indicates specifically how such performance measurements 517 can be acquired.

In another embodiment, the performance measurements acquired during post-manufacture performance path testing can comprise performance measurements 518 acquired during module-level performance path testing. The flow diagram of FIG. 3, discussed in detail above, indicates specifically how such performance measurements 518 can be acquired.

In this case (i.e., when module-level performance path testing is used), the memory device(s) 510 can optionally further store (i.e., can be adapted to further store, can be configured to further store, etc.) performance measurements 517 acquired during any type of wafer-level performance testing (e.g., wafer-level performance screen ring oscillator (PSRO) testing, wafer-level performance path testing, or any other suitable wafer-level performance testing) of the integrated circuit, wherein such wafer-level performance testing is performed for wafer-level chip dispositioning purposes based on wafer-level chip dispositioning rules 515. The correlator 540 can access the memory device(s) 510 and determine (i.e., can be adapted to access the memory device(s) and determine, can be configured to access the memory device(s) and determine, can be programmed to access the memory device(s) and determine) an additional correlation between the performance measurements 517 acquired during wafer-level performance testing and the performance measurements 518 acquired during module-level performance path testing. In this case, the processor(s) can further comprise a wafer-level chip dispositioning rules adjuster 560. This rules adjuster 560 can adjust (i.e., can be adapted to adjust, can be configured to adjust, can be programmed to adjust, etc.) the wafer-level chip dispositioning rules 515 based on the additional correlation and, particularly, can adjust the target performance values set for passing and failing chips as set forth in the dispositioning rules 515 in order to further optimize yield.

It should be understood that the computer system embodiments described above could be implemented, in whole or in part, in a computer hardware environment (e.g., a computer system) such as that described in detail below and depicted in FIG. 6. Alternatively, the computer system embodiments could be implemented on any other computerized device having the required data storage and processing capability to perform the described curve fitting and curve remapping processes (e.g., a laptop computer, tablet computer, handheld device, smart phone, etc.).

Also disclosed herein are embodiments of a computer program product. This computer program product can comprise a computer-readable storage medium, which stores a computer-readable program code. The computer-readable program code can comprise instructions that, when executed by a computer, perform the above-described method for optimizing integrated circuit product yield by adjusting target parameter values and, in turn, manufacturing line processes and/or wafer-level test performance targets based on the results of module-level performance path tests. More particularly, as will be appreciated by one skilled in the art, aspects of disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed embodiments may take the form of a computer program product embodied in one or more computer-readable medium(s) having computer-readable program code embodied thereon.

Any combination of one or more computer-readable medium(s) may be utilized. The computer-readable medium may be a non-transitory computer-readable storage medium or computer-readable signal medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
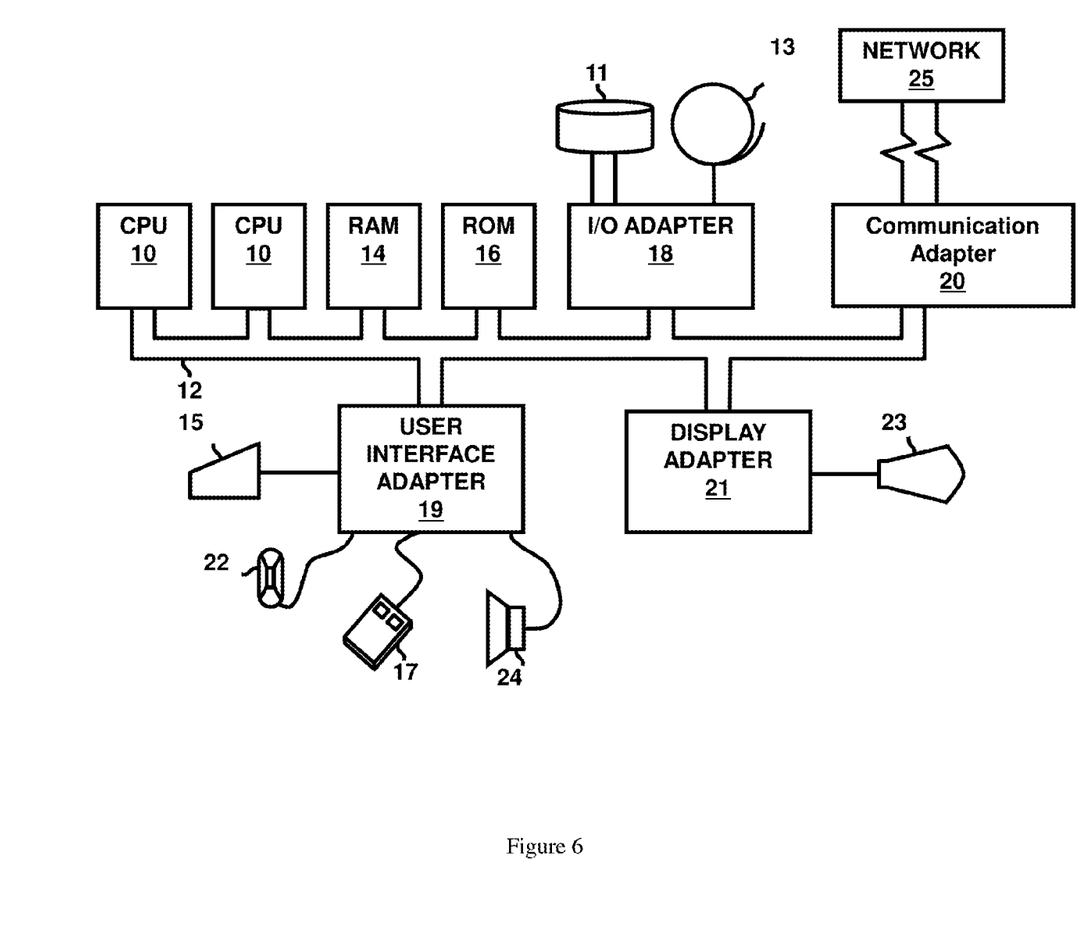
FIG. 6 is a schematic diagram illustrating a representative hardware environment for practicing disclosed embodiments.

A representative hardware environment for practicing the method, system and computer program product embodiments, as described in detail above, is depicted in FIG. 6. This schematic drawing illustrates a hardware configuration of an information handling/computer system in accordance with the disclosed embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowchart and block diagrams in the Figures illustrate the architecture, functionality, and operation of possible implementations of systems, methods and computer program products according to disclosed embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should further be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The above-description has been presented for purposes of illustration, but is not intended to be exhaustive or limiting. Many modifications and variations will be apparent to those of ordinary skill in the art without departing from the scope and spirit of the disclosed embodiments.

Therefore, disclosed above are embodiments of a method, system and computer program product for optimizing integrated circuit product yield by re-centering the manufacturing line and, optionally, adjusting wafer-level chip dispositioning rules, based on the results of post-manufacture performance path testing. Specifically, in the embodiments disclosed herein, a correlation can be made between in-line parameter measurements and performance path measurements acquired during post-manufacture performance path testing. Then, based on this correlation, the manufacturing line can be re-centered. Since the correlation between in-line parameter measurements and performance measurements acquired during post-manufacture performance path testing is more accurate than a correlation between in-line parameter measurements and performance measurements acquired during post-manufacture performance screen ring oscillator (PSRO) testing, yield loss is minimized. Optionally, an additional correlation can be made between performance measurements acquired during wafer-level performance testing (e.g., performance screen ring oscillator (PSRO) testing or other wafer-level performance testing) and performance measurements acquired particularly during module-level performance path testing and, based on this additional correlation, adjustments can be made to the wafer-level chip dispositioning rules to further minimize yield loss.

What is claimed is:

1. A method for optimizing integrated circuit product yield, said method comprising:
   accessing, by a computer, parameter measurements taken during manufacture of an integrated circuit and performance measurements acquired during post-manufacture performance path testing of selected sensitizable data paths within said integrated circuit;
   determining, by said computer, a correlation between said parameter measurements and said performance measurements; and
   adjusting, by said computer and based on said correlation, target parameter values to be used during subsequent manufacture of said integrated circuit.

2. The method of claim 1, said post-manufacture performance path testing comprising module-level performance path testing.

3. The method of claim 2, further comprising:
   accessing, by said computer, additional performance measurements acquired during wafer-level performance testing of said integrated circuit, said wafer-level performance testing being performed for wafer-level chip dispositioning according to wafer-level chip dispositioning rules;
   determining, by said computer, an additional correlation between said additional performance measurements and said performance measurements; and
   adjusting, by said computer and based on said additional correlation, said wafer-level chip dispositioning rules.

4. The method of claim 3, said additional performance measurements being acquired during wafer-level performance screen ring oscillator (PSRO) testing.

5. The method of claim 3, said additional performance measurements being acquired during wafer-level performance path testing.

6. The method of claim 1, said parameter measurements comprising any of physical parameter measurements and electrical parameter measurements and said performance measurements comprising delay measurements for said selected sensitizable data paths under specified test conditions.

7. The method of claim 1, said target parameter values comprising any of base parameter values and composite parameter values.

8. The method of claim 1, said parameter measurements being acquired from any of kerf structures and on-chip structures.

9. The method of claim 1, said post-manufacture performance path testing comprising wafer-level performance path testing.

10. A system for optimizing integrated circuit product yield, said system comprising:
   a memory storing parameter measurements acquired during manufacture of an integrated circuit and performance measurements acquired during post-manufacture performance path testing of selected sensitizable data paths within said integrated circuit; and
   at least one processor comprising the following:
      a correlator accessing said memory and determining a correlation between said parameter measurements and said performance measurements; and
      a process optimizer adjusting, based on said correlation, target parameter values to be used during subsequent manufacture of said integrated circuit.

11. The system of claim 10, said post-manufacture performance path testing comprising module-level performance path testing.

12. The system of claim 11,
   said memory further storing additional performance measurements acquired during wafer-level performance testing of said integrated circuit, said wafer-level performance testing being performed for wafer-level chip dispositioning based on wafer-level chip dispositioning rules,
   said correlator further accessing said memory and determining an additional correlation between said additional performance measurements and said performance measurements, and
   said system further comprising a rules adjuster adjusting said wafer-level chip dispositioning rules, based on said additional correlation.

13. The system of claim 12, said additional performance measurements being acquired during wafer-level performance screen ring oscillator (PSRO) testing.

14. The system of claim 12, said additional performance measurements being acquired during wafer-level performance path testing.

15. The system of claim 10, said parameter measurements comprising any of physical parameter measurements and electrical parameter measurements and said performance measurements comprising delay measurements for said selected sensitizable data paths under specified test conditions.

16. The system of claim 10, said target parameter values comprising any of base parameter values and composite parameter values.

17. The system of claim 10, said parameter measurements comprising being acquired from any of kerf structures and on-chip structures.

18. The system of claim 10, said post-manufacture performance path testing comprising wafer-level performance path testing.

19. A computer program product comprising a non-transitory computer-readable storage medium storing computer-readable program code, said computer-readable program code comprising instructions that, when executed by a computer, perform a method for optimizing integrated circuit product yield, said method comprising:
   accessing parameter measurements acquired during manufacture of an integrated circuit and performance measurements acquired during post-manufacture performance path testing of selected sensitizable data paths within said integrated circuit;
   determining a correlation between said parameter measurements and said performance measurements; and
   based on said correlation, adjusting target parameter values to be used during subsequent manufacture of said integrated circuit.

20. The computer program product of claim 19, said post-manufacture performance path testing comprising any of module-level performance path testing and wafer-level performance path testing and said performance measurements comprising delay measurements for said selected sensitizable data paths under specified test conditions.

* * * * *